(12) United States Patent
Cossart

(10) Patent No.: US 8,151,425 B2
(45) Date of Patent: Apr. 10, 2012

(54) METHODS AND APPARATUS FOR INSTALLING FASTENERS

(76) Inventor: William J. Cossart, Wayland, MA (US)

( * ) Notice: Subject to any disclaimer, the term of this patent is extended or adjusted under 35 U.S.C. 154(b) by 501 days.

(21) Appl. No.: 12/313,335

(22) Filed: Nov. 19, 2008

(65) Prior Publication Data

US 2010/0122445 A1    May 20, 2010

(51) Int. Cl.
*B25B 27/14* (2006.01)

(52) U.S. Cl. ............. 29/281.1; 29/275; 29/244; 81/451; 81/491

(58) Field of Classification Search .................. 29/281.6, 29/244, 254, 270–278; 81/451, 490, 491
See application file for complete search history.

(56) References Cited

U.S. PATENT DOCUMENTS

| 5,682,660 | A  | * | 11/1997 | Hansen ........................... 29/264 |
| 6,237,451 | B1 | * | 5/2001  | Wei ................................. 81/490 |
| 7,036,401 | B2 | * | 5/2006  | Carroll ........................ 81/177.2 |
| 7,156,002 | B1 | * | 1/2007  | Chan ........................... 81/177.4 |
| 7,185,568 | B1 | * | 3/2007  | Vance ........................ 81/177.2 |
| 7,814,631 | B2 | * | 10/2010 | Wallek ........................... 29/254 |
| 2008/0289459 | A1 | * | 11/2008 | Yablon ........................... 81/451 |
| 2010/0122445 | A1 | * | 5/2010  | Cossart ........................ 29/281.6 |
| 2011/0036214 | A1 | * | 2/2011  | Potterfield ..................... 81/467 |

\* cited by examiner

*Primary Examiner* — Lee D Wilson
(74) *Attorney, Agent, or Firm* — Kristofer E. Elbing

(57) ABSTRACT

Improved methods and apparatus for installing fasteners are disclosed. In one general aspect, a method of installing fasteners in partitions is presented. This method includes providing a threaded fastener having a first end engaged with an anchoring nut and a head at a second end. A driver head engages with the head of the threaded fastener with a driver head, and the anchor nut is then pushed through an opening to a second side of the partition. The driver head is used to then simultaneously both draw the head of the threaded fastener away from the partition and turn the head of the fastener to advance the fastener through the anchoring nut.

20 Claims, 3 Drawing Sheets

METHODS AND APPARATUS FOR INSTALLING FASTENERS

FIELD OF THE INVENTION

This invention relates to methods and apparatus for installing fasteners, such as toggle bolts, in partitions, such as walls.

BACKGROUND OF THE INVENTION

As shown in FIG. 1, a toggle bolt 10 generally includes a bolt 12 and a nut with spring-loaded collapsible folding wings 14. The toggle bolt may also be supplied with an optional hanger 16. Toggle bolts differ from molly screws in that they can generally hold much larger loads.

To install a toggle bolt 10, an installer typically drills a hole 22 in a wall or other partition 20, screws the collapsible winged nut 14 onto the end of the bolt, and pushes it through the hole. Inside the wall, the wings spring open, and the bolt can then be tightened to draw the wings towards the inside surface of the wall.

A problem with conventional toggle bolts is that the collapsible winged nut can spin around inside the wall as the bolt is turned. When this happens, the toggle bolt is not tightened. To avoid this problem, installers often pull on the screw thread with one hand as they manually turn the bolt with the other. This can be slow and cumbersome.

SUMMARY OF THE INVENTION

In one general aspect, the invention features a kit for installing fasteners in partitions that includes at least one fastener. The fastener includes at least one anchoring nut that includes a portion defining a threaded opening and at least one movable member attached to the portion that defines the threaded opening, a threaded shaft having a first end, a second end, a longitudinal axis, and threads sized and spaced to allow the first end of the shaft to engage threads in the threaded opening of the portion of the anchoring nut, and a head positioned at a second end of the shaft opposite the first end of the shaft. The head includes a plurality of driving surfaces that are at least generally perpendicular to a plane that is normal to the longitudinal axis of the threaded shaft of the fastener, a bearing surface that is at least generally normal to the longitudinal axis of the threaded shaft and is between the driving surfaces and the first end of the threaded shaft, and at least one retaining surface that is at least generally normal to the longitudinal axis of the threaded shaft and located further from the first end of the threaded shaft than the bearing surface along the longitudinal axis of the threaded shaft; and a driver head. The driver head includes a drive shaft for coupling to a rotatable driving motor, a plurality of driving surfaces operatively connected to the drive shaft and positioned to cooperate with the driving surfaces of the head of the fastener, and at least one retaining surface operatively connected to the drive shaft and positioned to cooperate with the retaining surface of the head of the fastener.

In preferred embodiments the driving surfaces of the fastener can include hexagonal bolt head flats. The driving surfaces of the fastener can include screw slot surfaces. The retaining surfaces can include medial surfaces of a pair of generally L-shaped retainer arms. The retainer arms can be retractable to allow them to move with respect to the shaft of the driver. The drive shaft can be hexagonal to allow it to be removably secured within a chuck of a portable motorized driver. The anchoring nut can be a spring-loaded toggle nut, with the movable member being one of a pair of spring-loaded wings.

In another general aspect, the invention features a method of installing fasteners in partitions that includes the steps of providing a threaded fastener having a first end engaged with an anchoring nut and a head at a second end, engaging the head of the threaded fastener with a driver head, pushing the anchor nut through an opening to a second side of the partition from a first side of a partition after the step of providing, and after the steps of engaging and pushing, using the driver head to simultaneously both draw the head of the threaded fastener away from the partition and turn the head of the fastener to advance the fastener through the anchoring nut.

In preferred embodiments the step of engaging the head of the threaded fastener with the driver can be performed before the step of pushing the anchor nut through the opening. The steps of pushing and using the driver head to simultaneously both draw and turn can be performed in one continuous operation. The method can further include the step of engaging the driver head in the chuck of a motorized screwdriver before the step of engaging the head of the threaded fastener. The step of providing can include screwing the threaded fastener into the anchoring nut and further include the step of placing an object to be suspended around the threaded fastener before the step of screwing the threaded fastener into the anchoring nut. The step of engaging the head can cause a dedicated driver retaining surface to engage a dedicated fastener retaining surface. The step of providing can provide a spring-loaded winged toggle nut, with the step of pushing causing the nut to expand after it has passed through the hole in the partition.

In a further general aspect, the invention features a kit for installing fasteners in partitions that includes anchoring means, a threaded fastener having a first end for engaging the anchoring means and including means for turning the fastener head at a second end, and means for simultaneously both drawing the threaded fastener away from the anchoring means and turning the threaded fastener with respect to the anchoring means via the turning means to advance the fastener through the anchoring nut.

In another general aspect, the invention features a method of installing fasteners in partitions that includes providing a threaded fastener having a first end engaged with an anchoring nut and a head at a second end, pushing the anchor nut through an opening to a second side of the partition from a first side of a partition after the step of providing, after the step of pushing, positioning a first arm of a spreading tool proximate a bearing surface of the head of the threaded fastener, after the step of pushing, positioning a second arm of a spreading tool proximate the opening in the partition, after the steps of positioning, causing the first arm of the spreading tool to bear against the partition and causing the second arm of the spreading tool to bear against the head of the fastener, and tightening the fastener while the spreading tool bears against the partition and the head of the fastener.

In preferred embodiments the steps of positioning can each include at least partially surrounding a portion of the fastener with a notch on an arm of the spreading tool. The step of causing the first arm of the spreading tool to bear against the partition and causing the second arm to bear against the head of the fastener take place in response to the user moving a pair of handles on the spreading tool.

Methods and apparatus according to the invention can be beneficial in that they allow toggle bolts to be installed quickly and easily. Because users can apply outward pressure using a an electric screwdriver as they install a toggle bolt, the whole installation can be performed in one simple motion, usually with one hand. This avoids the awkward and time-consuming manual approach that is often used. As a result, the cost of installation each toggle bolt can be reduced significantly.

Methods and apparatus according invention can also be advantageous in that they allow for a safer installation operation. Specifically, it is tempting to try to hold the threads or the bottom of the head of a toggle bolt with one hand while at the same time attempting to tighten it with an electric driver. But the screw can wobble, and it is easy for the driver bit to slip, potentially stabbing the installer's hand. The rotating threads can also potentially cut or burn the installer's fingers. And larger bolts could even pinch the user's fingers. If there is pressure to work quickly and/or a large number of toggle bolts to install, the chances of discomfort or injury increases. Using methods and apparatus according to the invention, however, the installer's hands can be kept safely away from the rotating threads and the sharp point of the driver.

Methods and apparatus according to the invention can also lead to more reliable installations. Because the user can squarely pull the toggle bolt back, it is less likely to spin around inside the wall. This spinning might otherwise scrape away material inside the wall, such as wallboard or plaster, and weaken it. This could result in catastrophic failure of the wall around the toggle bolt and the possibility of damage or injury.

By making their installation easier and safer, moreover, toggle bolts may be more likely to be selected for a particular application. This can provide added robustness, reliability, and safety because toggle bolts tend to be quite strong in comparison to other types of easily installed fasteners. And making the installation of toggle bolts easier and safer can also make them more attractive for use by less experienced installers.

One beneficial application is in health care settings, such as hospitals. As technology advances, large hospitals may need to repeatedly retrofit large numbers of rooms with new equipment. This equipment can include sensitive and/or dangerous components, such as monitoring electronics or oxygen feeds. Using methods and apparatus according to the invention can allow these installations to proceed safely and efficiently.

DETAILED DESCRIPTION OF AN
ILLUSTRATIVE EMBODIMENT

Figure 1A:
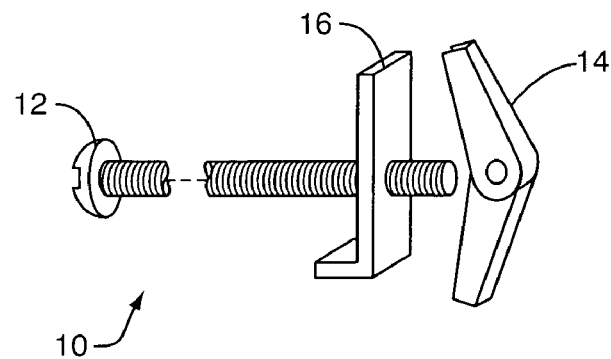
FIG. 1A is an exploded perspective view of a prior art toggle bolt.
Figure 1B:
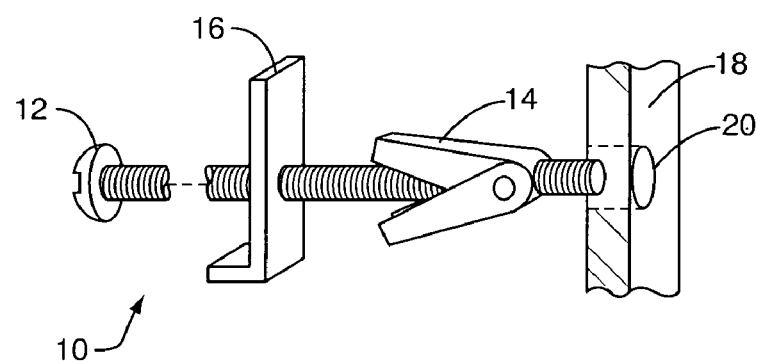
FIG. 1B is a perspective view of the bolt of FIG. 1 being inserted in a hole in a wall.
Figure 1C:
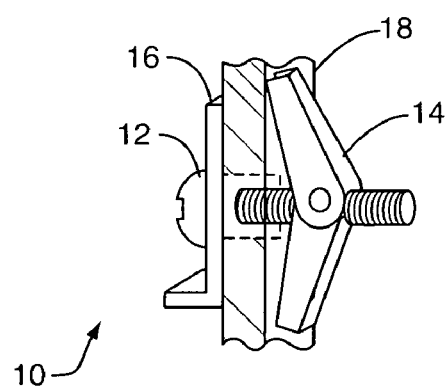
FIG. 1C is a perspective view of the bolt of FIG. 1 after insertion in the hole in the wall.
Figure 2A:
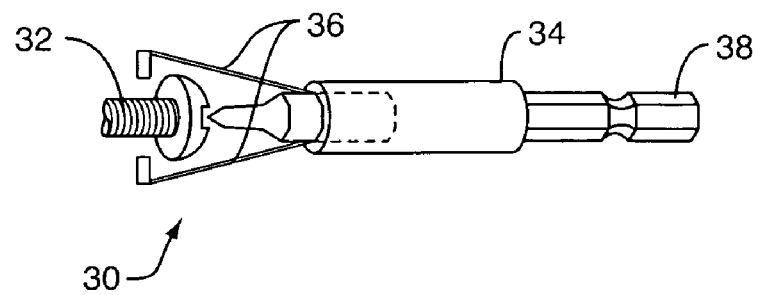
FIG. 2A is a side view of a toggle bolt installation tool according to the invention as it is being fitted to a toggle bolt.
Figure 2B:
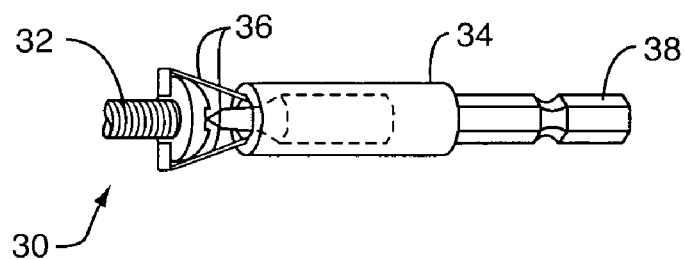
FIG. 2B is a side view of the toggle bolt installation tool of FIG. 2A in its engaged position.

Referring to FIG. 2A, an illustrative toggle bolt installation tool 30 according to the invention includes a body 34 that holds a driver bit and a retaining mechanism, which can include one or more retainer arms 36 that surround the driver bit. A shaft 38 is attached to the body and preferably has a hexagonal cross-section to allow an electric drill or screwdriver chuck to hold it without slipping. The user can also pull on the shaft to retract the driver bit and tighten the retainer arms, in order to firmly hold a bolt or other threaded fastener 32 by its head (see FIG. 2B). One of ordinary skill in the art will recognize that the fastener can be one of a variety of standard types, such as Philips-head screws, slotted screws, hex bolts, or allen screws.

Figure 3A:
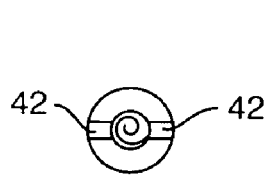
FIG. 3A is a bottom view of a head of a screw-headed toggle bolt according to the invention.
Figure 3B:
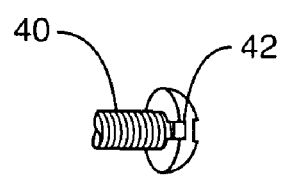
FIG. 3B is a side view of the screw-headed toggle bolt of FIG. 3A.
Figure 3C:
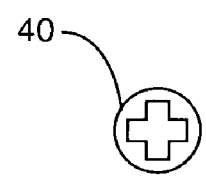
FIG. 3C is a top view of the screw-headed toggle bolt of FIG. 3A.

Referring to FIG. 3A, the fastener can also be specifically designed to interact with the retaining mechanism. For example, a Phillips-head screw 40 can include notches 42 on the bottom of its head that interact with narrow retainer arms. This type of arrangement can hold the fastener more reliably, and may allow the faster to be loaded more quickly. One of ordinary skill in the art will recognize that the retention interface used this approach can use a wide variety of cooperating shapes. These shapes can allow the retaining mechanism to pull the fastener by a surface that is normal to the axis of rotation of the bolt, or it can operate in some other way, such as by squeezing the bolt.

Figure 4:
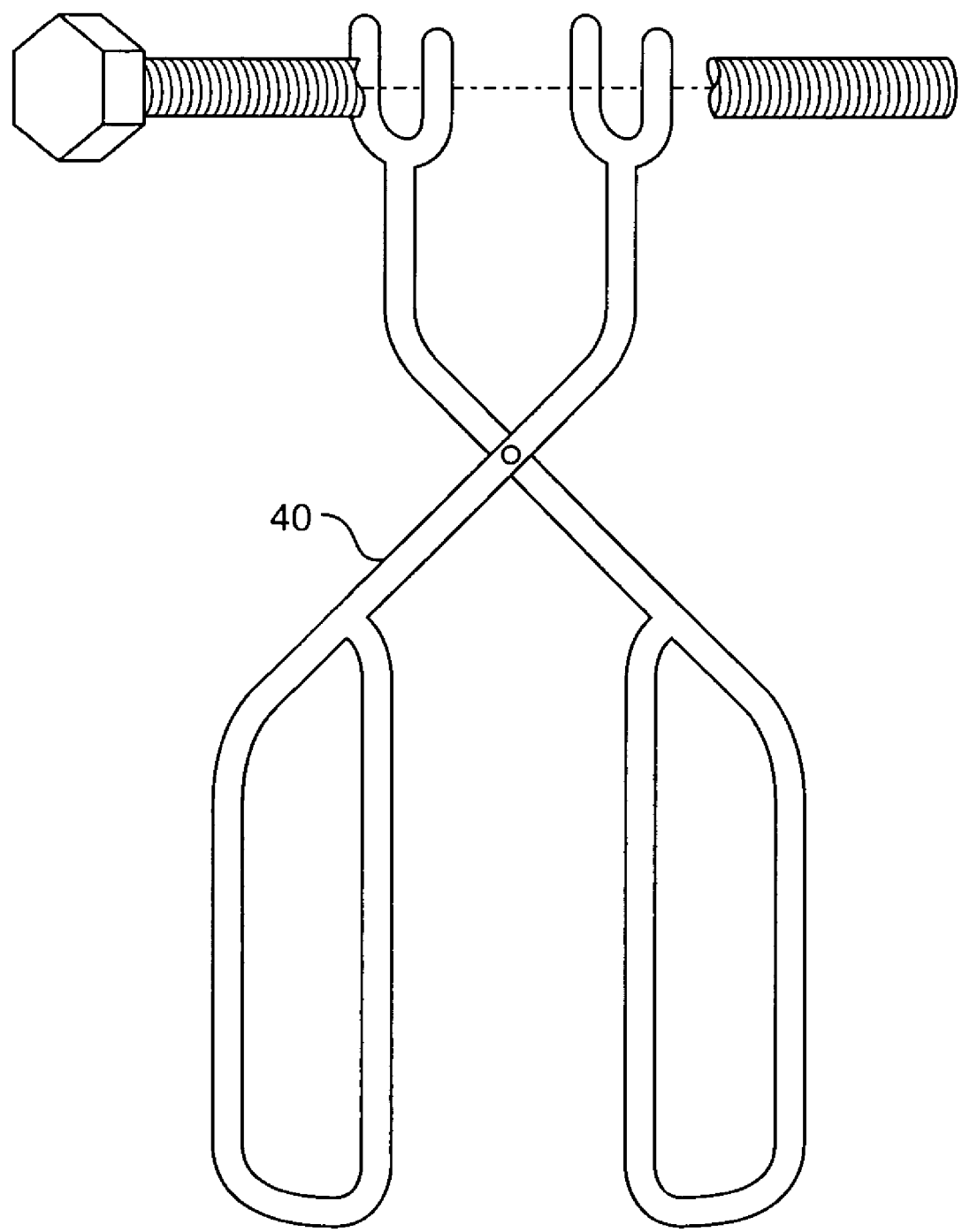
FIG. 4 is a side view of a spreading tool for toggle bolt installation according to the invention.

Referring to FIG. 4, another embodiment of the invention employs a hand-held, spreading tool. This tool includes handles that allow a user to apply a spreading force to two tips. One or both of these two tips are preferably each C-shaped, to allow them to surround the fastener proximate the wall and the head of the fastener. This type of tool can easily accommodate toggle bolts of varying sizes.

The illustrative tool shown in FIG. 4 is similar in construction to a common pair of scissors and could be produced relatively inexpensively. One of ordinary skill in the art would readily recognize that there a variety of other ways to implement such a tool. For example, a different type of mechanism could allow the toggle bolt spreading action to take place in response to the installer squeezing, instead of spreading, the handles of the tool. The tips could also be offset from the handles to allow the installer to work in tighter quarters.

The invention has now been described in connection with a number of specific embodiments thereof. However, numerous modifications which are contemplated as falling within the scope of the present invention should now be apparent to those skilled in the art. For example, systems and methods according to the invention may also be applicable to other types of fasteners that can support large loads. It is therefore intended that the scope of the present invention be limited only by the scope of the claims appended hereto. In addition, the order of presentation of the claims should not be construed to limit the scope of any particular term in the claims.

What is claimed is:

1. A kit for installing fasteners in partitions, including at least one fastener, including:
   at least one anchoring nut that includes a portion defining a threaded opening and
   at least one movable member attached to the portion that defines the threaded opening,
   a threaded shaft having a first end, a second end, a longitudinal axis, and threads sized and spaced to allow the first end of the shaft to engage threads in the threaded opening of the portion of the anchoring nut, and
   a head positioned at a second end of the shaft opposite the first end of the shaft and including:

a plurality of driving surfaces that are at least generally perpendicular to a plane that is normal to the longitudinal axis of the threaded shaft of the fastener, a bearing surface that is at least generally normal to the longitudinal axis of the threaded shaft and is between the driving surfaces and the first end of the threaded shaft, and at least one retaining surface that is at least generally normal to the longitudinal axis of the threaded shaft and located further from the first end of the threaded shaft than the bearing surface along the longitudinal axis of the threaded shaft; and a driver head, including:
 a drive shaft for coupling to a rotatable driving motor,
 a plurality of driving surfaces operatively connected to the drive shaft and positioned to cooperate with the driving surfaces of the head of the fastener, and
 at least one retaining surface operatively connected to the drive shaft and positioned to cooperate with the retaining surface of the head of the fastener.

2. The kit of claim 1 wherein the driving surfaces of the fastener include hexagonal bolt head flats.

3. The kit of claim 1 wherein the driving surfaces of the fastener include screw slot surfaces.

4. The kit of claim 1 wherein the retaining surfaces include medial surfaces of a pair of generally L-shaped retainer arms.

5. The kit of claim 4 wherein the retainer arms are retractable to allow them to move with respect to the shaft of the driver.

6. The kit of claim 1 wherein the drive shaft is hexagonal to allow it to be removably secured within a chuck of a portable motorized driver.

7. The kit of claim 1 wherein the anchoring nut is a spring-loaded toggle nut and wherein the movable member is one of a pair of spring-loaded wings.

8. A method of installing fasteners in partitions, including:
 providing a threaded fastener having a first end engaged with an anchoring nut and a head at a second end,
 engaging the head of the threaded fastener with a driver head,
 pushing the anchor nut through an opening to a second side of the partition from a first side of a partition after the step of providing, and
 after the steps of engaging and pushing, using the driver head to simultaneously both draw the head of the threaded fastener away from the partition and turn the head of the fastener to advance the fastener through the anchoring nut.

9. The method of claim 8 wherein the step of engaging the head of the threaded fastener with the driver is performed before the step of pushing the anchor nut through the opening.

10. The method of claim 9 wherein the steps of pushing and using the driver head to simultaneously both draw and turn are performed in one continuous operation.

11. The method of claim 8 further including the step of engaging the driver head in the chuck of a motorized screwdriver before the step of engaging the head of the threaded fastener.

12. The method of claim 8 wherein the step of providing includes screwing the threaded fastener into the anchoring nut and further including the step of placing an object to be suspended around the threaded fastener before the step of screwing the threaded fastener into the anchoring nut.

13. The method of claim 8 wherein the step of engaging the head causes a dedicated driver retaining surface to engage a dedicated fastener retaining surface.

14. The method of claim 8 wherein the step of providing provides a spring-loaded winged toggle nut and wherein the step of pushing causes the nut to expand after it has passed through the hole in the partition.

15. A kit for installing fasteners in partitions, including anchoring means,
 a threaded fastener having a first end for engaging the anchoring means and including means for turning the fastener at a second end, and
 means for simultaneously both drawing the threaded fastener away from the anchoring means and turning the threaded fastener with respect to the anchoring means via the turning means to advance the fastener through the anchoring nut.

16. A method of installing fasteners in partitions, including:
 providing a threaded fastener having a first end engaged with an anchoring nut and a head at a second end,
 pushing the anchor nut through an opening to a second side of the partition from a first side of a partition after the step of providing,
 after the step of pushing, positioning a first arm of a spreading tool proximate a bearing surface of the head of the threaded fastener,
 after the step of pushing, positioning a second arm of a spreading tool proximate the opening in the partition,
 after the steps of positioning, causing the first arm of the spreading tool to bear against the partition and causing the second arm of the spreading tool to bear against the head of the fastener, and
 tightening the fastener while the spreading tool bears against the partition and the head of the fastener.

17. The method of claim 16 wherein the steps of positioning each includes at least partially surrounding a portion of the fastener with a notch on an arm of the spreading tool.

18. The method of claim 16 wherein the steps of causing the first arm of the spreading tool to bear against the partition and causing the second arm of the spreading tool to bear against the head of the fastener take place in response to the user moving a pair of handles on the spreading tool.

19. The kit of claim 4 wherein the retaining surface of the head of the fastener is one of a plurality of retaining surfaces in a plurality of notches in the head of the fastener.

20. The method of claim 13 wherein the dedicated fastener retaining surface is one of a plurality of retaining surfaces in a plurality of notches in the head of the fastener.

* * * * *